Patented Apr. 20, 1954

2,676,166

UNITED STATES PATENT OFFICE 2,676,166

POLYMERIC QUATERNARY AMMONIUM COMPOUNDS

Vincent Joseph Webers, Wilmington, Del., assignor to E. I. du Pont de Nemours and Company, Wilmington, Del., a corporation of Delaware No Drawing. Application April 1, 1952,
Serial No. 279,937

6 Claims. (Cl. 260—85.7)

This invention relates to polymeric quaternary ammonium compounds and to a process of preparing same and, more particularly, to new polymeric quaternary ammonium compounds.

Polymeric compounds containing quaternary ammonium hydroxide or salt groups are becoming of increasing technical interest in various applications such as, for example, acid-dyeable adjuvants to fiber-forming polymeric materials. The study of quaternary ammonium polymers has, however, been greatly retarded by the few polymers of this type that are available and by the lack of satisfactory methods for preparing them.

An object of the present invention is to provide an economic process of preparing polymeric quaternary ammonium compounds from readily available polymers in one operation. A further object is to provide new polymeric quaternary ammonium compounds. Other objects will be apparent from the description of the invention given hereinafter.

The above objects are accomplished according to the present invention by reacting a copolymer of a vinylidene monomer free from epoxy groups and an ethylenically unsaturated epoxy-group containing monomer, with a tertiary monoamine and either water or an acid or a combination of both. The resulting product is a copolymer containing polymerized units of a vinylidene monomer free of epoxy groups and polymerized units of an ethylenically unsaturated epoxy monomer in which latter units the oxirane ring has opened to alpha-hydroxy-beta-quaternary ammonium groups. The resulting compound can also contain unreacted epoxy groups. These polymeric quaternary ammonium compounds are characterized by having at least 0.3% nitrogen, by weight, and a molecular weight of at least 500.

In carrying out the reaction of the present invention the copolymer should have a molecular weight above about 500 and contain from about 0.3% to about 8%, by weight, of oxirane oxygen and it should be reacted with a tertiary amine and with a compound HX in which X is hydroxyl or an anion, the tertiary amine and HX compound each being used in amounts of at least 0.25 equivalent per oxirane oxygen atom in the epoxy-containing copolymer.

It will be understood that an epoxy group, also called oxirane group, is the group

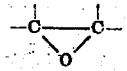

The oxygen atom which is part of the oxirane group is referred to as oxirane oxygen.

The reaction involved in carrying out the process of the present invention may be represented by the following equation:

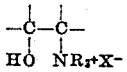

wherein

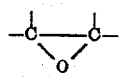

represents the epoxy groups contained in the copolymer, $R_3N$ is a tertiary monoamine and HX is a compound wherein X is hydroxyl or an anion, i. e., HX is water or an inorganic or organic acid.

The polymeric compounds of this invention are quaternary ammonium hydroxides or salts, depending on whether the reactant HX is water or an acid. They are resinous materials of viscous to semi-solid consistency and of indefinite melting point. Most of these compounds are soluble in dilute aqueous acids, e. g., 1–10% aqueous acetic acid, and many of them are soluble in water. In some instances, however, particularly when the starting copolymer has a low oxirane oxygen content, i. e., a low proportion of polymerized epoxy monomer, and/or when the degree of substitution by the tertiary amine is low, the polymer is insoluble or only slightly soluble in dilute acids. In all cases, nevertheless, the polymers contain at least 0.3%, by weight, of nitrogen and this minimum proportion is necessary for significant modification of the starting copolymer. Preferably, the polymers contain between 0.5% and 5% of nitrogen.

The polymeric quaternary ammonium compounds of this invention have a plurality of pairs of adjacent extralinear carbon atoms, one carbon atom of a pair carrying a quaternary ammonium radical and the other a hydroxyl group. Otherwise expressed, these compounds have a plurality of extralinear units containing the group

wherein Q is a quaternary ammonium radical. As previously stated, these compounds are further characterized by containing at least 0.3% nitrogen, by weight, and having a molecular weight of at least 500.

Preparation of these polymeric quaternary ammonium compounds can be conveniently carried out as follows: A solution, preferably at 25–75% concentration, of the epoxide copolymer in an organic solvent which is substantially inert to the reactants used under the operating conditions, is treated with the tertiary amine, the amount of the latter being at least 0.25 equivalent, and preferably between 0.5 and 5 equivalents, per epoxy group. If desired, the amine is dissolved, preferably at 10–50% concentration, in an inert organic solvent. This is particularly desirable when a volatile amine such as trimethylamine is used. There is added to the reaction mixture water or an organic or inorganic acid in amounts of at least 0.25 equivalent, and preferably between 0.25 and 5 equivalents, per epoxy group. If desired, both water and an acid can be used simultaneously. The reaction mixture is usually, but not necessarily, diluted to about 20% solids by addition of an inert organic solvent, preferably one that is partly or completely miscible with water, such as methyl ethyl ketone or dioxane. The reaction mixture is then held at a suitable temperature, preferably between 15° C. and 100° C., until reaction has taken place. The progress of the reaction can be followed in a simple manner by determining the solubility of a sample of the reaction product in dilute aqueous acid, e. g., 10% acetic acid, or in water, since the starting polymers are insoluble in either medium. If the reaction product is insoluble in either dilute acid or water, as is sometimes the case when the starting material has a low content of epoxide groups, the reaction product can be tested qualitatively or quantitatively for the presence of nitrogen. For useful modification, the reaction product should contain at least 0.3% nitrogen.

The reaction product is conveniently isolated by either of two general procedures: (a) All solvents and volatile amine are removed by vacuum distillation at low or moderate temperature, e. g., 40° C. When the residue becomes quite viscous, some water may be added to thin it out, and the distillation is continued until the residue reaches or approaches the theoretical dry weight. The polymeric quaternary ammonium base or salt is preferably stored as a 20–40% solution in water or dilute acetic acid, or as an organic solvent solution. (b) The reaction mixture is poured into a poor solvent for the quaternary ammonium polymer, such as ether, and the precipitated nitrogen-containing polymer is stirred with additional ether. The process may be repeated by redissolving the polymer in an appropriate solvent and reprecipitating it with ether. The solvents are then removed by vacuum distillation, and the reaction product is preferably stored as a solution in a convenient solvent, particularly water if possible.

The following examples wherein all proportions are by weight unless otherwise stated, illustrate the preparation of specific polymeric quaternary ammonium compounds in accordance with the present invention. The "oxirane equivalent" given in the examples can be defined as the decimal fraction of one equivalent (atom) of oxirane oxygen present in the weight of copolymer employed. It is given by the formula:

$$\frac{\text{Weight of copolymer} \times \text{oxirane oxygen per cent}}{16 \times 100}$$

Example I

The starting material was an allyl glycidyl ether/vinyl acetate copolymer having a molecular weight of 3500 and containing 9.3% of polymerized allyl glycidyl ether (1.3% oxirane oxygen). A solution of 24.1 g. of this copolymer (corresponding to 0.02 oxirane equivalent) in 15.9 g. of methyl ethyl ketone was mixed with 2.36 g. of trimethylamine in 12.2 g. of isopropyl alcohol (equivalent ratio of trimethylamine to oxirane 2.0:1) and with 0.72 g. of water (equivalent ratio of water to oxirane 2.1:1). The mixture was diluted with 62 g. of dioxane and allowed to react 10 days at room temperature. The reaction product was a water-soluble, neutral polymer containing quaternary ammonium hydroxide side groups.

A number of other examples are given below. Since they were all carried out substantially in accordance with the method just described, these examples are described in condensed form for the sake of brevity. The following abbreviations are used:

AGE/VAc=allyl glycidyl ether/vinyl acetate copolymer
AGE/S=allyl glycidyl ether/styrene copolymer
eq.=equivalent
eq. ratio=equivalent ratio of tertiary amine or HX compound to oxirane oxygen present in the copolymer
M. W.=molecular weight

Example II

AGE/VAc (M. W. 7000, 4.42% AGE, 0.62% oxirane oxygen), 9.61 g. (0.00373 oxirane eq.) in 5.4 g. dioxane, mixed with 0.49 g. trimethylamine (eq. ratio 2.2:1) in 2.5 g. isopropyl alcohol and 0.15 g. water (eq. ratio 2.2:1). Added 24 g. acetone and reacted 2 days, room temperature. The product dissolved in water and precipitated on addition of sodium hydroxide. It slowly redissolved in dilute acetic acid.

Example III

AGE/VAc (M. W. 1000, 11.7% AGE, 1.64% oxirane oxygen), 12.26 g. (0.0123 oxirane eq.) in 7.74 g. methyl ethyl ketone, mixed with 1.47 g. trimethylamine (eq. ratio 2:1), 0.63 g. water (eq. ratio 2.84:1) and 1.8 g. acetic acid (eq. ratio 2.43:1). Added 31 g. dioxane and reacted 16 hours, room temperature. Product was water-soluble.

Example IV

AGE/VAc (M. W. about 2000, 30.6% AGE, 4.28% oxirane oxygen), 200 g. (0.537 oxirane eq.) in 79 g. methyl ethyl ketone, mixed with 35.4 g. trimethylamine (eq. ratio 1.1:1) in 180 g. isopropyl alcohol and 32.2 g. acetic acid (eq. ratio 1:1). Reacted 4 days, room temperature. The product was water-soluble and neutral.

Example V

AGE/VAc (M. W. 3360, 17.5% AGE, 2.45% oxirane oxygen), 192 g. (0.296 oxirane eq.) in 108 g. dioxane, mixed with 8.74 g. trimethylamine (eq. ratio 0.5:1) in 45.2 g. isopropyl alcohol and 8.9 g. acetic acid (eq. ratio 0.5:1). Reacted 1 hour, 100° C., then 16 hours, room temperature. Reaction product was water-soluble.

Example VI

AGE/VAc (M. W. about 2000, 30.6% AGE, 4.31% oxirane oxygen), 14.32 g. (0.0386 oxirane eq.) in 5.68 g. methyl ethyl ketone, mixed with 5.54 g. trimethylamine hydrochloride (eq. ratio 1.5:1). Added 60 g. isopropyl alcohol and reacted 20 minutes 80° C. Product was water-soluble.

Example VII

AGE/VAc (M. W. about 1000, 9.3% AGE, 1.3% oxirane oxygen), 21.7 g. (0.0111 oxirane eq.) in 8.3 g. methyl ethyl ketone, mixed with 1.225 g. triethylamine (eq. ratio 1.1:1), 0.89 g. acetic acid (eq. ratio 1.3:1) and 0.2 g. water (eq. ratio 1:1). Added 20.7 g. dioxane and reacted 3¾ hours at 80–85° C. Product was soluble in water and dilute acetic acid.

*Example VIII*

AGE/VAc (M. W. about 2000, 30.6% AGE, 4.28% oxirane oxygen), 14.32 g. (0.0386 oxirane eq.) in 5.68 g. methyl ethyl ketone, mixed with 7.96 g. triethylamine hydrochloride (eq. ratio 1.5:1). Added 60 g. isopropyl alcohol and reacted 4½ hours at 80–85° C. Product was water-soluble.

*Example IX*

AGE/VAc (M. W. 3360, 17.5% AGE, 2.45% oxirane oxygen), 4.49 g. (0.00692 oxirane eq.) in 2.51 g. dioxane, mixed with 5.29 g. tri-n-butylamine (eq. ratio 4:1) and 0.41 g. acetic acid (eq. ratio 1:1). Added 20.7 g. dioxane and reacted 8 hours at 80–85° C. Product was water-soluble.

*Example X*

AGE/VAc (M. W. 7000, 4.42% AGE, 0.62% oxirane oxygen), 7.95 g. (0.00308 oxirane eq.) in 4.4 g. dioxane, mixed with 9.8 g. pyridine (eq. ratio 40:1). Since the water-solubility of the product had not increased after 2½ days, room temperature, and a 30-minute heating period at 80–85° C., 2 g. water (eq. ratio 36:1) was added and the mixture heated 2 hours at 80–85° C. Product was initially water-soluble, became insoluble later.

*Example XI*

AGE/VAc (M. W. about 2000, 30.6% AGE, 4.28% oxirane oxygen), 14.32 g. (0.0386 oxirane eq.) in 5.68 g. methyl ethyl ketone, mixed with 4.57 g. pyridine (eq. ratio 1.5:1) and 3.8 g. acetic acid (eq. ratio 1.6:1). Added 31 g. dioxane and reacted 16 hours, room temperature. Product was water-soluble, precipitated by addition of ether.

*Example XII*

AGE/VAc (M. W. 3360, 17.5% AGE, 2.45% oxirane oxygen), 4.49 g. (0.00692 oxirane eq.) in 2.51 g. dioxane, mixed with 3.57 g. quinoline (eq. ratio 4:1) and 0.41 g. acetic acid (eq. ratio 1:1). Added 20.7 g. dioxane and reacted 1 hour at 80–85° C. Product was water-soluble.

*Example XIII*

AGE/VAc (M. W. 5000, 11% AGE, 1.54% oxirane oxygen), 20.8 g. (0.02 oxirane eq.) in 9.9 g. methyl ethyl ketone, mixed with 4.68 g. N,N-dimethyl-n-dodecylamine (eq. ratio 1.1:1) and 1.2 g. acetic acid (eq. ratio 1:1). Added 72.3 g. dioxane and reacted 24 hours, room temperature, then 1 hour at 80°–85° C. Product was water-soluble.

*Example XIV*

AGE/VAc (M. W. 4000, 9.8% AGE, 1.37% oxirane oxygen), 13.4 g. (0.0115 oxirane eq.) in 6.6 g. dioxane, mixed with 3.02 g. N,N-dimethylaniline (eq. ratio 2.1:1) and 1.65 g. acetic acid (eq. ratio 2.4:1). Added 41.3 g. dioxane and reacted 3 days, room temperature, then 6½ hours at 80–85° C. Product was water-soluble.

*Example XV*

AGE/VAc (M. W. 1000, 11.7% AGE, 1.64% oxirane oxygen), 12.26 g. (0.0123 oxirane eq.) in 7.74 g. of a mixture of methyl ethyl ketone and isopropyl alcohol, mixed with 2.83 g. N-ethylpiperidine (eq. ratio 2:1) and 0.63 g. water (eq. ratio 3:1). Added 41.3 g. dioxane and reacted 4 hours at 80°–85° C. Product was water-soluble.

*Example XVI*

Same as Example XV, but using N-methylmorpholine, 2.52 g. Product was water-soluble.

*Example XVII*

AGE/VAc (M. W. 3360, 17.5% AGE, 2.45% oxirane oxygen), 4.49 g. (0.00692 oxirane eq.) in 2.51 g. dioxane, mixed with 3.19 g. N-ethylmorpholine (eq. ratio 4:1) and 0.41 g. acetic acid (eq. ratio 1:1). Added 20.7 g. dioxane and reacted 4 hours at 80°–85° C. Product was water-soluble.

*Example XVIII*

Same as Example XVII, but using N-(2-hydroxyethyl)-morpholine, 3.63 g., and reacting 6 hours at 100° C. Product was water-soluble.

*Example XIX*

Allyl glycidyl ether/methyl methacrylate copolymer (M. W. 2000, 28.2% allyl glycidyl ether, 3.95% oxirane oxygen), 36.7 g. (0.092 oxirane eq.) in 23.3 g. xylene, mixed with 8.85 g. trimethylamine (eq. ratio 1.6:1) in 45.8 g. isopropyl alcohol and 1 g. water (eq. ratio 0.6:1). Reacted 3 days, room temperature. Product was water-soluble.

*Example XX*

Allyl glycidyl ether/butyl methacrylate copolymer (M. W. 2000, 40% allyl glycidyl ether, 5.6% oxirane oxygen), 37.15 g. (0.131 oxirane eq.) in 12.85 g. xylene, mixed with 9.3 g. trimethylamine (eq. ratio 1.2:1) in 47.9 g. isopropyl alcohol and 1 g. water (eq. ratio 0.42:1). Reacted 1 day, room temperature. Product was water-soluble.

*Example XXI*

AGE/S (M. W. 2000, 28.2% AGE, 3.95% oxirane oxygen), 5.49 g. (0.0135 oxirane eq.) in 2.37 g. xylene, mixed with 3.93 g. trimethylamine (eq. ratio 5:1) in 20.6 g. isopropyl alcohol and 1.8 g. water (eq. ratio 7.4:1). Added 51.7 g. dioxane and reacted 3 days, room temperature. The product was water-soluble. A 0.2 normal solution had an estimated pH of 13.2 (calculated: 13.3 for complete dissociation).

*Example XXII*

AGE/S (M. W. 2000, 28.2% AGE, 3.95% oxirane oxygen), 14.0 g. (0.0346 oxirane eq.) in 6.0 g. xylene, mixed with 4.13 g. trimethylamine (eq. ratio 2:1) in 21.4 g. isopropyl alcohol and 1.26 g. water (eq. ratio 2:1). Added 20.7 g. dioxane and reacted 16 hours, room temperature. The product was soluble in water, dilute acids and was strongly basic. After isolation by precipitation with ether, it had a neutralization equivalent of 578.

*Example XXIII*

AGE/S (M. W. 6300, 3.5% AGE, 0.49% oxirane oxygen), 97.2 g. (0.0297 oxirane eq.) in 413 g. dioxane, mixed with 12 g. trimethylamine (eq. ratio 6.7:1) in 62 g. isopropyl alcohol and 3.6 g. water (eq. ratio 6.7:1). Reacted 18 days, room temperature. Product was insoluble in water and dilute acetic acid. It contained 0.31% nitrogen.

*Example XXIV*

AGE/S (M. W. 2000, 28.2% AGE, 3.95% oxirane oxygen), 34.9 g. (0.0865 oxirane eq.) in 15.1 g. xylene, mixed with 10.62 g. trimethylamine (eq. ratio 2:1) in 53.5 g. isopropyl alcohol and 4.8 g. acetic acid (eq. ratio 1:1). Added 51.7 g. dioxane and reacted 1 day, room temperature. Product was water-soluble.

Example XXV 4-vinylcyclohexene monoepoxide/vinyl acetate copolymer (M. W. 2200, 9.3% 4-vinylcyclohexene monoepoxide, 1.2% oxirane oxygen), 10.0 g. (0.0075 oxirane eq.) in 10.0 g. methyl ethyl ketone, mixed with 0.89 g. trimethylamine (eq. ratio 2:1) in 4.6 g. isopropyl alcohol and 1.2 g. acetic acid (eq. ratio 2.66:1). Added 20.7 g. dioxane and reacted 14 hours at 80°–85° C. The product was almost completely soluble in water and dilute acetic acid.

Example XXVI

Glycidyl methacrylate/butyl methacrylate copolymer (M. W. 3500, 30% glycidyl methacrylate, 3.38% oxirane oxygen), 10.0 g. (0.0211 oxirane eq.) in 10.0 g. methyl isobutyl ketone, mixed with 2.95 g. trimethylamine (eq. ratio 2.3:1) in 15.25 g. isopropyl alcohol and 0.65 g. water (eq. ratio 1.7:1). Reacted 2 hours, room temperature. Product was water-soluble.

The foregoing examples are merely illustrative and the present invention broadly comprises reacting a copolymer of a vinylidene monomer free from epoxy groups and an ethylenically unsaturated epoxy-group containing monomer, with a tertiary monoamine and water or an acid, to form a polymeric quaternary ammonium compound containing at least 0.3% nitrogen and having a molecular weight of at least 500.

As starting material in the preparation of the polymeric quaternary ammonium compounds of this invention, there can be used any copolymer of a polymerizable, ethylenically unsaturated compound containing epoxy groups with a polymerizable ethylenically unsaturated compound free from epoxy groups and in which copolymer the oxirane oxygen content is within the range of from about 0.3% to about 8%. Such copolymers offer a number of important technical advantages in the preparation of polymeric quaternary ammonium compounds. In the first place, it is possible with their use to obtain polymeric quaternary ammonium compounds of high molecular weight and, moreover, the molecular weight is controllable to a large extent since the starting copolymers are made by free radical-initiated addition polymerization according to methods well understood in the art. In the second place, copolymers of the type defined above can be obtained which combine high molecular weight with high oxirane oxygen content, a combination which is not possible when using epoxy polymers such as, for example, those prepared by condensing dihydric phenols and epichlorohydrin in alkaline solution. In the third place, the starting copolymers are in general easy to prepare by well-known methods and, in many cases, they offer substantial economic advantages since the bulk of the weight can be derived from a cheap, readily available vinylidene monomer.

As already stated, the epoxy copolymer should contain at least about 0.3% of oxirane oxygen since, if the oxirane oxygen content is appreciably below that value, there will not be enough epoxy groups present to react effectively with the tertiary amine. On the other hand, if the polymerizable epoxy compound is present in the polymerization mixture in proportions such that the resulting copolymer has appreciably more than 8% of oxirane oxygen, then the polymerization becomes difficult to carry out and control as, in many cases, unsaturated epoxy monomers do not polymerize well. Furthermore, the above-mentioned economic advantages are substantially lessened. Preferably, the starting copolymer contains between 0.6% and 7% of oxirane oxygen. Copolymers within the desired range of oxirane oxygen content are generally obtained when the weight ratio of polymerized epoxy compound to polymerized oxirane-free unsaturate is within the range of 3:97 to 60:40.

The molecular weight of the copolymer is desirably above 500 in order that the final products have the desired polymeric properties. As a consequence, the molecular weight of the final products will be at least 500. Preferably, the molecular weight of the copolymer is in the range of from about 1000 to about 10,000. The preferred copolymers have at least two epoxy groups per molecule.

The epoxide copolymers are prepared by free radical-initiated polymerization according to known methods and with known free radical-producing initiators. It is, of course, important to avoid conditions which would tend to open or otherwise destroy the epoxy groups, such as the presence of strong acids. In order to produce copolymers of the desired composition, the monomers are in general used in relative amounts within the range of 5 to 75 parts of oxirane-containing unsaturate for 95 to 25 parts of oxirane-free unsaturate. Two or more comonomers of each type can be used provided the above ratios are observed.

In addition to the epoxide copolymers shown in the examples, other suitable starting materials include the copolymers of other ethylenically unsaturated epoxy compounds such as butadiene monoepoxide, glycidyl acrylate, glycidyl methacrylate, vinyl glycidyl phthalate, allyl glycidyl maleate, allyl glycidyl phthalate, and the like with various vinylidene monomers such as vinyl acetate, methyl acrylate, ethyl acrylate, methyl methacrylate, acrylamide, methacrylamide, acrylonitrile, methacrylonitrile, styrene, 1,3-butadiene, isoprene, 2-chloro-1,3-butadiene, vinyl chloride, vinyl fluoride, isopropenyl acetate, vinylidene chloride, methyl vinyl ether, acrolein, methyl vinyl ketone, and the like. Preferably, these copolymers are made from monomers having only one ethylenic, carbon to carbon double bond, to minimize the danger of cross-linking to insoluble materials. These copolymers should obviously be prepared from monomers free from groups containing active hydrogen capable of reacting with an epoxide group.

The preferred starting materials, because they give the most generally useful polymeric quaternary ammonium compounds, are the copolymers of allyl glycidyl ether with polymerizable vinylidene compounds, i. e., compounds having a terminal methylene group attached through a double bond to the adjacent carbon atom. These preferred materials include the copolymers of allyl glycidyl ether with the vinyl halides, e. g., vinyl chloride, vinyl fluoride; the vinyl esters of monocarboxylic acids, e. g., vinyl acetate, vinyl propionate; the acrylic and methacrylic esters, nitriles and amides, e. g., methyl methacrylate, ethyl acrylate, acrylonitrile, methacrylonitrile, methacrylamide; the monounsaturated hydrocarbons having a terminal ethylenic double bond, e. g., isobutylene, styrene; and the like. Particularly preferred are the copolymers of vinyl acetate and allyl glycidyl ether, especially those containing between 3% and 50% by weight of polymerized allyl glycidyl ether.

Any tertiary monoamine may be used to prepare the polymeric quaternary ammonium compounds, although it is preferred to use an amine of relatively low molecular weight, e. g., one containing a total of between 3 and 24 carbon atoms. The preferred amines are those in which the radicals attached to the amino nitrogen each contain from 1 to 6 carbon atoms, inclusive. Still more preferred are the ethylenically saturated amines containing only carbon and hydrogen in addition to the amino nitrogen. Suitable amines in addition to those shown in the examples, include tri-n-propylamine, tri-n-octylamine, N,N-dimethylstearylamine, triallylamine, N,N-dimethyloleylamine, N,N-dimethylcyclohexylamine, N,N-dimethylbenzylamine, 2-ethylpyridine, N,N-dimethylnaphthylamine, and the like. The tertiary amine should preferably have a basicity equivalent to an ionization constant of at least $1\times10^{-9}$. With weak bases in particular, it is advantageous to use an acid rather than water as the third reactant, in order to increase the reaction rate and bring the reaction time down to a convenient value, and to avoid degradation of the polymer which might be caused by prolonged heating.

For good results, the amine should be used in amount of at least 0.25 equivalent per oxirane oxygen atom in the epoxide-containing copolymer. Preferably, it is used in amounts between 0.5 and 5.0 equivalents per epoxy group. More can be used, if desired, but this is uneconomical and unnecessary.

The third reactant is water or an acid, leading to a polymeric quaternary ammonium hydroxide or salt. Any inorganic or organic acid can be used, including for example, hydrochloric, phosphoric, sulfuric, acetic, propionic, benzoic, and lactic acids. It is advantageous to use a cheap and common acid. Preferably, the acid is a monobasic acid having a dissociation constant of at least $1\times10^{-5}$. An amine carbonate can sometimes be used advantageously. Water and an acid can be used simultaneously. The water and/or the acid should be used in amounts of at least 0.25 equivalent per epoxy group, and preferably between 0.5 and 3 equivalents. It is usually desirable to use the acid in amounts between 0.5 and 1.5 equivalents per equivalent of amine, since a large excess of acid relative to the amine might cause excessive opening of the epoxy groups in the polymer. Water can be used in large excess relative to the amine, although there is usually no advantage in doing so.

If the third reactant, i. e., water or acid, is omitted, either no reaction takes place during a reasonable period, or a reaction of an obscure nature takes place, leading to insoluble and infusible materials.

The process is carried out conveniently by bringing the three reactants in contact and allowing the reaction to proceed, preferably at a temperature in the range of 0° C. to 150° C., and still more preferably in the range of 15° C. to 100° C. The reaction time depends on the temperature to a considerable extent. As already noted, the reaction rate when weakly basic amines are used is accelerated by using an acid as the third reactant, rather than water. In most cases the progress of the reaction can be followed by testing the solubility of the product in dilute acid or water. In other cases the product, after removal of the unchanged amine, can be tested qualitatively or quantitatively for the presence of nitrogen. For appreciable modification, the final product should contain at least 0.3% of nitrogen.

The products of this invention are polymers having a plurality of pairs of adjacent extralinear carbon atoms, one carbon atom of a pair carrying a quaternary ammonium radical and the other a hydroxyl group. In other words, these polymers contain, attached to carbon atoms of the linear polymeric chain a plurality of extralinear units containing the group

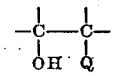

where Q represents a quaternary ammonium hydroxide or salt group. To illustrate, when the starting material is a copolymer containing as the unsaturated epoxide component the unit

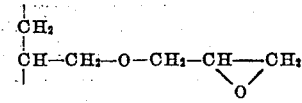

where the first two carbon atoms are part of the linear polymer chain, the resulting product will be a polymer of the same structure except that the epoxy group in the side chain has opened to give a side chain in which adjacent carbon atoms bear a hydroxyl group and a quaternary ammonium group, respectively.

These nitrogen-containing polymers have molecular weights above about 500, and the more useful ones range in molecular weights from about 1000 to about 10,000. Most of these polymers are soluble in either water or in dilute acid, e. g., 1–10% aqueous acetic acid, and these soluble polymers are particularly useful and therefore preferred.

The polymers containing quaternary ammonium hydroxide groups are in general strongly basic. However, in cases where the vinylidene portion of the polymer contains hydrolyzable ester groups, for example, with products derived from allyl glycidyl ether/vinyl acetate copolymers, aqueous solution of the quaternary ammonium bases may be neutral or nearly so, presumably because of partial hydrolysis of the acetate groups by the strong base. The polymeric quaternary ammonium hydroxides are preferably stored in aqueous or acid solutions, since the isloated free bases are sometimes unstable. Even the polymeric quaternary ammonium salts are preferably stored in solution, from which they can readily be isolated if desired.

The polymeric products of this invention are quite versatile and find uses in such various applications as antistatic coatings, emulsifying agents for wax, oil or insecticide dispersions, surface-modifiers for glass or silica, and, generally, as ingredients of film-forming coating and impregnating compositions. These products are widely useful as surface-active agents. The acid-insoluble products which can be handled in organic solvent solutions, are useful as acid-dyeable ingredients of fiber-forming polymeric compositions.

As many apparently widely different embodiments of this invention may be made without departing from the spirit and scope thereof, it is to be understood that the invention is not limited

The invention claimed is:

1. A polymeric quaternary ammonium compound containing between 0.5% and 5% nitrogen, by weight, said compound being obtained by reacting a copolymer of allyl glycidyl ether and vinyl acetate, said copolymer having a molecular weight of 1,000 to 10,000 and containing 0.6% to 7%, by weight, of oxirane oxygen, with a tertiary monoamine having a basicity equivalent to an ionization constant of at least $1 \times 10^{-9}$ in an amount between 0.5 and 5 equivalents per oxirane oxygen atom, and a compound from the group consisting of water and acids, in an amount between 0.25 and 5 equivalents per oxirane oxygen atom.

2. A polymeric quaternary ammonium compound as set forth in claim 1, wherein said copolymer is reacted with a tertiary monoamine containing three hydrocarbon radicals of 1 to 6 carbon atoms, inclusive, attached to the amino nitrogen.

3. A polymeric quaternary ammonium compound as set forth in claim 1, wherein said copolymer is reacted with a tertiary monoamine from the group consisting of trimethylamine and triethylamine.

4. Process of preparing a polymeric quaternary ammonium compound which comprises reacting a copolymer of a vinylidene monomer free from epoxy groups and an ethylenically unsaturated epoxy-group containing monomer, said copolymer having a molecular weight of at least 500 and containing 0.3% to 8%, by weight, of oxirane oxygen, with a tertiary monoamine having a basicity equivalent to an ionization constant of at least $1 \times 10^{-9}$ and a compound from the group consisting of water and acids, each in an amount of at least 0.25 equivalent per oxirane oxygen atom.

5. Process of preparing a polymeric quaternary ammonium compound which comprises reacting a copolymer of a vinylidene monomer free from epoxy groups and an ethylenically unsaturated epoxy-group containing monomer, said copolymer having a molecular weight of 1,000 to 10,000 and containing 0.6% to 7%, by weight, of oxirane oxygen, with a tertiary monoamine having a basicity equivalent to an ionization constant of at least $1 \times 10^{-9}$ in an amount between 0.5 and 5 equivalents per oxirane oxygen atom, and a compound from the group consisting of water and acids, in an amount between 0.25 and 5 equivalents per oxirane oxygen atom.

6. Process as set forth in claim 5 wherein said copolymer is a copolymer of allyl glycidyl ether and vinyl acetate.

References Cited in the file of this patent.

UNITED STATES PATENTS

| Number | Name | Date |
|---|---|---|
| 2,173,069 | Ulrich et al. | Sept. 12, 1939 |
| 2,556,075 | Erickson | June 5, 1951 |
| 2,562,897 | Ellingboe | Aug. 7, 1951 |
| 2,581,392 | De Groote | Jan. 8, 1952 |